United States Patent
Savir et al.

(10) Patent No.: US 11,520,667 B1
(45) Date of Patent: Dec. 6, 2022

(54) INFORMATION TECHNOLOGY RESOURCE FORECASTING BASED ON TIME SERIES ANALYSIS

(71) Applicant: EMC IP Holding Company LLC, Hopkinton, MA (US)

(72) Inventors: Amihai Savir, Sansana (IL); Idan Levy, Kadima-Zoran (IL); Shai Harmelin, Herzliya (IL); Shiri Gaber, Herzliya (IL); Avitan Gefen, Herzliya (IL); Lindsay Braine, London (GB)

(73) Assignee: EMC IP Holding Company LLC, Hopkinton, MA (US)

( * ) Notice: Subject to any disclaimer, the term of this patent is extended or adjusted under 35 U.S.C. 154(b) by 543 days.

(21) Appl. No.: 15/585,353

(22) Filed: May 3, 2017

(51) Int. Cl.
*G06F 11/14* (2006.01)
*G06Q 10/06* (2012.01)

(52) U.S. Cl.
CPC ..... *G06F 11/1458* (2013.01); *G06Q 10/0631* (2013.01)

(58) Field of Classification Search
None
See application file for complete search history.

(56) References Cited

U.S. PATENT DOCUMENTS

| | | | |
|---|---|---|---|
| 9,538,401 B1* | 1/2017 | Ouyang | H04W 16/22 |
| 10,318,874 B1* | 6/2019 | Duncan | G06N 20/00 |
| 2016/0189043 A1* | 6/2016 | McGeever | G06N 5/04 706/46 |
| 2016/0247069 A1* | 8/2016 | Baughman | G06N 20/00 |
| 2017/0076216 A1* | 3/2017 | Akrotirianakis | G06N 7/005 |
| 2018/0097744 A1* | 4/2018 | Hu | H04L 67/1002 |
| 2018/0211266 A1* | 7/2018 | Theocharous | G06Q 30/0202 |

* cited by examiner

*Primary Examiner* — Thu N Nguyen
(74) *Attorney, Agent, or Firm* — Dergosits & Noah LLP; Todd A. Noah

(57) ABSTRACT

Information technology resource forecasting based on time series analysis is described. A system creates multiple forecasts for an information technology resource by applying corresponding multiple time series models to first data associated with the information technology resource. The system selects a model of the multiple time series models by comparing the multiple forecasts for the information technology resource to second data associated with the information technology resource. The system outputs a forecast that is created by applying the selected model to third data associated with the information technology resource.

18 Claims, 5 Drawing Sheets

INFORMATION TECHNOLOGY RESOURCE FORECASTING BASED ON TIME SERIES ANALYSIS

BACKGROUND

An information technology operations enterprise may manage many information technology resources required by a business for continuous operations. Enterprise executives need to constantly find new ways to create value with existing infrastructure while ensuring that a shortage of information technology resources would never interrupt business operations. These executives rely heavily on information technology resource forecasting tools to make budgeting and information technology resource allocation decisions. Current information technology resource forecasting tools are typically implemented manually by collecting and processing data across different teams and systems.

The storage devices used by a backup/restore application are examples of one type of an information technology resource. If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. Data deduplication significantly reduces backup time by only storing unique periodic changes, while maintaining full backups for restoration. The transmission of a de-duplicated backup sends only changed data, thereby reducing network traffic. When the data protection administrator decides to return a data object to a previous state, the data protection administrator specifies the desired previous state by identifying a desired point in time when the data object was in this state, and instructs the backup/restore application to execute a restore operation to restore a copy of the corresponding backup files for that state to the data object.

A data object may be stored on a storage array, which is a disk storage system that includes multiple disk drives. Unlike a disk enclosure, a storage array has cache memory and advanced functionality, such as virtualization and Redundant Array of Independent Disks (RAID). A data protection administrator may manage a backup/restore application to create backups files of data objects and store the backup files of data objects on multiple storage arrays.

DETAILED DESCRIPTION

Figure 1:
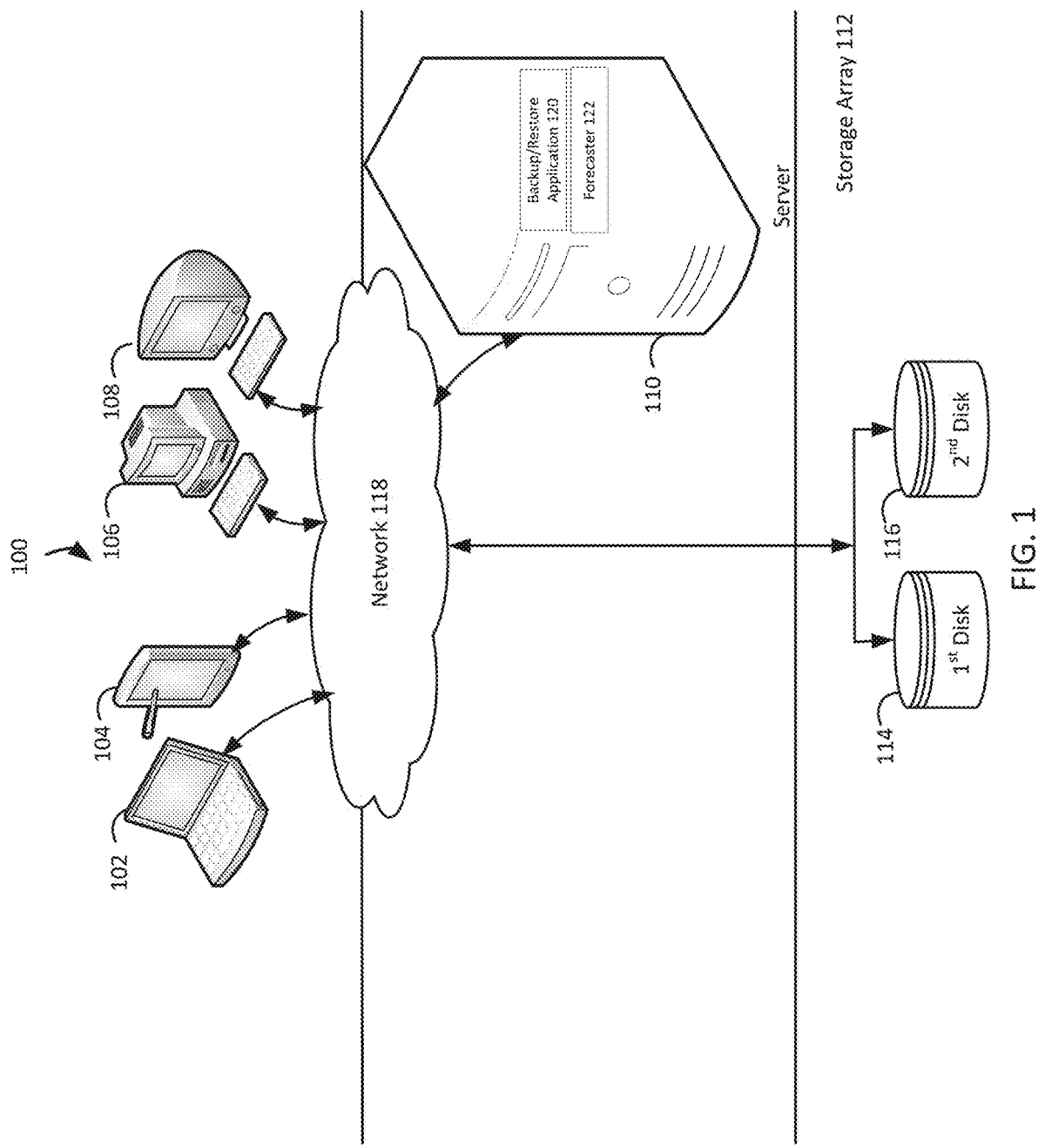
FIG. 1 illustrates a block diagram of a simplified example system for information technology resource forecasting based on time series analysis, under an embodiment.

Existing information technology resource planning methodologies suffer from low accuracy at a level that makes them irrelevant in many cases. One challenge lies in the assumption that one statistical model can fit to any resource trend, which is an assumption that may be erroneous in many cases and can result in low-accuracy forecasts generated by generic models. Another challenge is that forecasts are usually run once in a given quarter, with no further estimation performed following that, even though critical changes may occur and have an effect on the environment as a whole. This blind period may result in executives taking uninformed decisions. These gaps may lower the trust executives have in automation of information technology resource forecasting tools, thereby leading these executives to embrace a more manual approach. Another challenge is that running an information technology resource forecast manually usually becomes a time-consuming task. An additional challenge is that manual calculations of the information technology resource forecasting is typically done by a human expert, which creates the risk of a single point of failure in the process and, again, tends to be slow and expensive. The misleading assumption that one model can be used for all type of behaviors leads to low accuracy forecasts in cases when the model does not fit the given data well. As an example, a method that experts use frequently is a linear regression model with only two parameters, slope and intersect. The actual data patterns tend to be complicated and sometimes contain seasonality that requires more sophisticated methods. In these cases. using a linear model for prediction can be highly misleading. Absence of real-time visibility to the resource status directly leads to the inability to detect and react fast when unexpected scenarios occur. A customer may complain that they could not see foresee an information technology resource depletion. Since executives do not get real-time insights on the current statuses of resources as part of the planning process, they cannot compare the current forecast to the original forecast and draw conclusions for subsequent improvement.

Embodiments herein provide information technology resource forecasting based on time series analysis. A system creates multiple forecasts for an information technology resource by applying corresponding multiple time series models to first data associated with the information technology resource. The system selects a model of the multiple time series models by comparing the multiple forecasts for the information technology resource to second data associated with the information technology resource. The system outputs a forecast that is created by applying the selected model to third data associated with the information technology resource.

For a simplified example, a forecaster applies an autoregressive integrated moving average model, a Holt-Winter model, and a linear regression model to a storage disk's June through September storage capacity usages to create three forecasts for the disk's capacity usages. The forecaster compares the forecasts for the disk to the disk's October through November storage capacity usages, and selects the Holt-Winter model as the most accurate model. The forecaster applies the selected Holt-Winter model to the disk's June through November storage capacity usages to create a forecast that the disk will be utilizing 90% of its total storage capacity by the end of January, and outputs the forecast to a system administrator who can address the disk's future possible storage capacity depletion.

FIG. 1 illustrates a diagram of a simplified example of a system that implements information technology resource forecasting based on time series analysis, under an embodiment. As shown in FIG. 1, a system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client device 102, a second client device 104, a third client device 106, a fourth client device 108; and a server 110 and a storage array 112 that may be provided by a hosting company. Although FIG. 1 depicts the first client 102 as a laptop computer 102, the second client 104 as a tablet computer 104, the third client 106 as personal computer 106, and the fourth client 108 as an iMac computer 108, each of the clients 102-108 may be any type of computer. The storage array 112 includes a first disk 114 and a second disk 116. The clients 102-108, the server 110, and the storage array 112 communicate via a network 118. Although FIG. 1 depicts the system 100 with four clients 102-108, one server 110, one storage array 112, two disks 114-116, and one network 118, the system 100 may include any number of clients 102-108, any number of servers 110, any number of storage arrays 112, any number of disks 114-116, and any number of networks 118. The clients 102-108 and the server 110 may each be substantially similar to the system 500 depicted in FIG. 5 and described below.

The server 110 includes a backup/restore application 120 that creates backup files of data objects for the clients 102-108, and executes a rollback based on the backup files. The backup/restore application 120 provides centralized administration, such as scheduling, monitoring, and managing backup operations and backup files. The backup/restore application 120 enables the storing of backup operation schedules, client policies, and client configurations. The backup/restore application 120 provides a unique interface to the clients 102-108 during login, and assists the server 110 in authenticating and registering the clients 102-108. The backup/restore application 120 sends backup/restore work orders to the clients 102-108, which receive and process the work orders to start a backup or restore operation. The backup/restore application 120 maintains a local database of all processes that execute on the server 110. The backup/restore application 120 executes server-side processes for a system administrator's graphical management console, which may enable the system administrator to use command line interface tools for queries. For example, a system administrator identifies the clients 102-108 registered with the server 110.

The server 110 includes a forecaster 122 that forecasts utilization of the disks 114-116. The forecaster 122 may be a separate component from the backup/restore application 120 or an integrated module within the backup/restore application 120. Although FIG. 1 depicts the backup/restore application 120 and the forecaster 122 residing completely on the server 110, the backup/restore application 120 and the forecaster 122 may reside in any combination of partially on the server 110 and partially on the clients 102-108. Even though the following paragraphs describe EMC Corporation's Avamar® backup/restore application and EMC Corporation's NetWorker® backup/restore application as examples of the backup/restore application 120 the backup/ restore application 120 may be any other backup/restore application which provides the backup/restore functionalities described in the Background section.

The backup/restore application 120 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

The backup/restore application 120 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

The system 100 creates multiple forecasts for an information technology resource by applying corresponding multiple time series models to first data associated with the information technology resource. When the system 100 creates the multiple forecasts for the information technology resource, the system 100 can create a linear regression forecast for the information technology resource by applying a linear regression model to the first data associated with the information technology resource. For example, the forecaster 122 applies an autoregressive integrated moving average model, a Holt-Winter model, and a linear regression model to disk 114's June through September storage capacity usages to create three forecasts for disk 114's storage capacity usage. The first data may be historical data for an information technology resource, which may be referred to as training data that is used by models that create training forecasts of the information technology resource's usage. While this example describes the forecaster 122 creating multiple forecasts for a single information technology resource, the forecaster 122 may create multiple forecasts for each of multiple information technology resources, and create multiple forecasts for a group of information technology resources. For example, the forecaster 122 creates three forecasts for disk 114's storage capacity usage, creates three forecasts for disk 116's storage capacity usage, and creates three forecasts for disk 114 and disk 116's collective storage capacity usage. In these examples, the disk 114 stores data for the clients 102-104 while the disk 116 stores data for the clients 106-108. Although these examples describe the information technology resources as storage disks, the information technology resource may be any type of information technology resource, such as network traffic capacity, central processor(s) utilization, or random access memory utilization.

Figure 2:
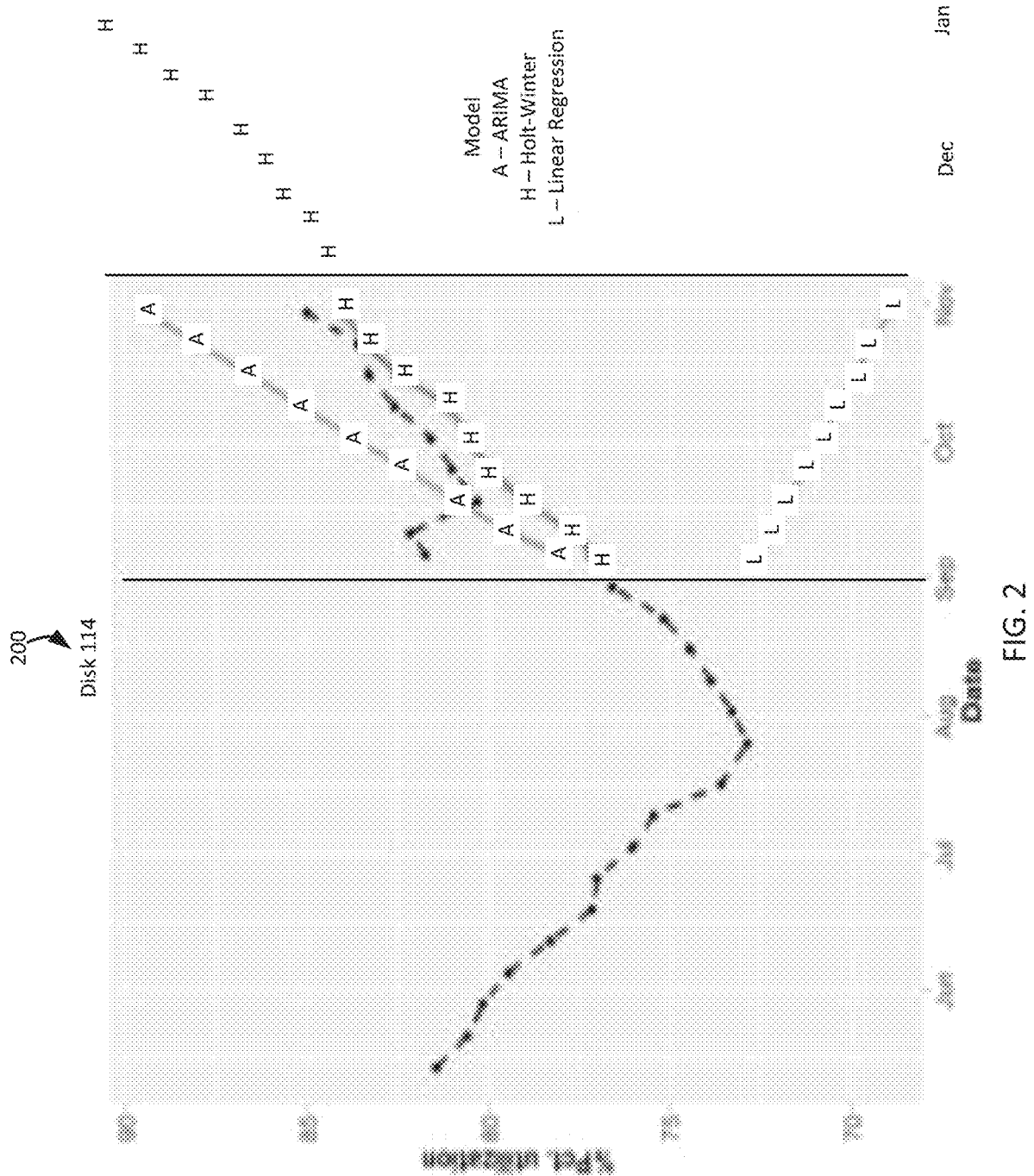
FIG. 2 illustrates a simplified example graph for information technology resource forecasting based on time series analysis, under an embodiment.
Figure 3:
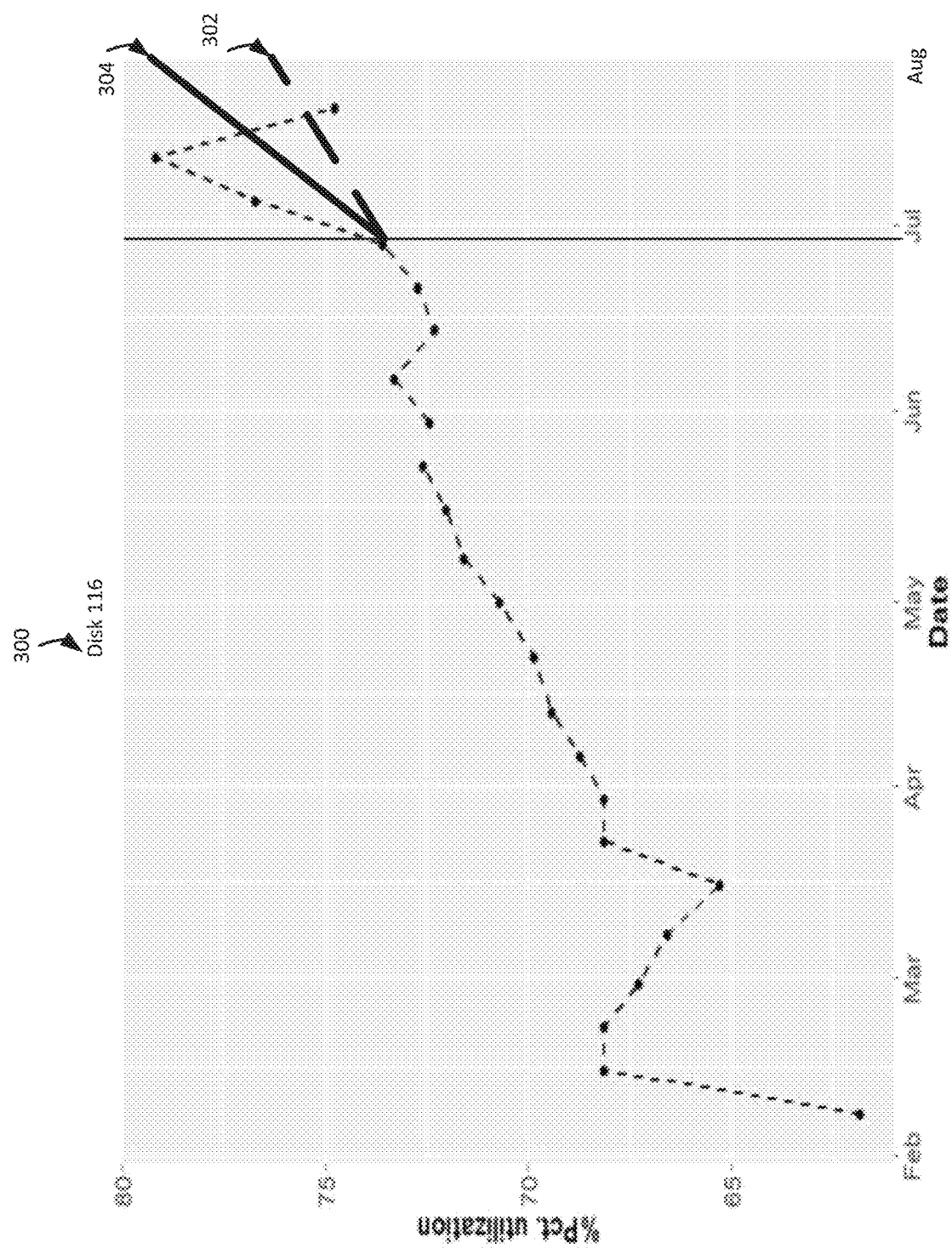
FIG. 3 illustrates another simplified example graph for information technology resource forecasting based on time series analysis, under an embodiment.

FIG. 2 illustrates a simplified example graph 200 for information technology resource forecasting based on time series analysis, which depicts June through September storage capacity usage of the disk 114. By applying the autoregressive integrated moving average model to the June through September storage capacity usages of the disk 114, the forecaster 122 creates an autoregressive integrated moving average forecast for the storage capacity usage of the disk 114 during the months of October and November, which is depicted by the sequence of the letters "A." By applying the Holt-Winter model to the June through September storage capacity usage of the disk 114, the forecaster 122 creates a Holt-Winter forecast for the storage capacity usage of the disk 114 during the months of October and November, which is depicted by the sequence of the letters "H." By applying the linear regression model to the June through September storage capacity usage of the disk 114, the forecaster 122 creates a linear regression forecast for the storage capacity usage of the disk 114 during the months of October and November, which is depicted by the sequence of the letters "L." Although FIG. 2 depicts the forecaster 122 using months of data that includes weekly data points to create forecasts based on months of data that includes weekly data points, the forecaster 122 may use any time period of data that includes any number of data points to create forecasts based on any time period of data that includes any number of data points.

Although the examples describe the forecaster 122 using only two time series models to create forecasts, the forecaster 122 can use any number of time series models to create forecasts. Examples of time series models include a stochastic model, an autoregressive model, an integrated model, a moving average model, an autoregressive moving average model, an autoregressive integrated moving average model, an autoregressive fractionally integrated moving average model, a vector autoregression model, a multivariate model, an exogenous model, a nonlinear autoregressive exogenous model, an autoregressive conditional heteroskedasticity model, a doubly stochastic model, a Markov switching multifractal model, a hidden Markov model, a general state space model, an unobserved components model, and a Holt-Winter model. A forecast can be a prediction or estimate of future events, especially a trend. An information technology resource can be a computer and/or telecommunications system asset for storing, studying, manipulating, retrieving, and/or sending information. A time series model can be a representation that is used to follow and/or imitate a sequence of values of a quantity obtained on successive occasions, often with equal intervals between them. Data can be the quantities, characters, or symbols on which operations are performed by a computer, being stored and transmitted in the form of electrical signals and recorded on magnetic, optical, or mechanical recording media.

Having created multiple forecasts, the system 100 selects a model of the multiple time series models by comparing the multiple forecasts for the information technology resource to second data associated with the information technology resource. When selecting the model of the multiple time series models, the system 100 can select one of the multiple time series models or the linear regression model by comparing the multiple forecasts for the information technology resource and the linear regression forecast to the second data associated with the information technology resource. For example, the forecaster 122 compares the forecasts for the disk 114 to disk 114's October through November storage capacity usages, and selects the Holt-Winter model as the most accurate model. The selection of the most accurate model may be based on any best fit or error reduction method.

The graph 200 depicts the three forecasts for disk 114's October through November storage capacity usages and the actual data for disk 114's October through November storage capacity usages. The graph 200 depicts that the Holt-Winter forecast for the disk 114 was the most accurate forecast for the actual data for disk 114's October through November storage capacity usages. The second data may be referred to as testing data that the forecaster 122 uses to determine which model creates the most accurate forecast for an information technology resource, which enables the forecaster 122 to select this model to create subsequent forecasts based on subsequent data for the information technology resource. This testing data may be historical data for the information technology resource that is more recent than the historical data for the information technology resource than the forecaster 122 used to create the forecasts. However, the testing data may also be subsequent data for the information technology resource that the forecaster 122 compares to the forecasts to select the model that creates the most accurate forecasts for the information technology resource.

Although these examples describe the forecaster 122 selecting one model for one information technology resource by comparing forecasts for the one information technology resource with data for the one information technology resource, the forecaster 122 can also select the same model or a different model for another information technology resource by comparing forecasts for the other information technology resource with data for the other information technology resource. For example, the forecaster 122 selects the Holt-Winter model as the most accurate model for the disk 114 and selects the Holt-Winter model as the most accurate model for the disk 116. In another example, the forecaster 122 selects the Holt-Winter model as the most accurate model for the disk 114 and selects the autoregressive integrated moving average model as the most accurate model for the disk 116.

The system 100 can receive and/or retrieve the third data associated with the information technology resource, which is data that is created after the selection of the most accurate model for the information technology resource, in real-time and/or near real-time. For example, the disk 114 sends its subsequent storage capacity usage data to the forecaster 122 in real-time. In another example, the forecaster 122 requests the subsequent storage capacity usage data from the disk 116 in near real-time. Receiving and/or retrieving subsequent data in real time and/or near real time enables the forecaster 122 to quickly respond to sudden and unexpected changes in the data for an information technology resource by creating a new forecast and/or outputting an alert, thereby bringing the sudden and unexpected changes in the data to the attention of a system administrator. Real-time can be relating to a system in which input data is processed within milliseconds so that it is available virtually immediately as feedback. Near real-time can be the delay introduced in telecommunications and/or computing by automated data processing or network transmission, between the occurrence of an event and the use of the processed data, such as for display or feedback and control purposes.

After selecting the most accurate model for an information technology resource, the system 100 outputs a forecast that is created by applying the selected model to third data associated with the information technology resource. For example, the forecaster 122 applies the selected Holt-Winter model to disk 114's June through November storage capacity usages to create a forecast that the disk 114 will be utilizing 90% of its total storage capacity by the end of January, and outputs the forecast to a system administrator who can address disk 114's future possible storage capacity depletion. In this example, the forecaster 122 forecasts when 90% of disk 114's total capacity will be utilized because the system administrator selected 90% as the target for forecasts so that the system administrator will have sufficient time to take action before the utilization reaches 90% of the disk 114's total capacity, rather than waiting for a potential storage crisis when the utilization reaches 100% of the disk 114's total capacity.

The graph 200 depicts that the forecaster 122 used the Holt-Winter model to create a Holt-Winter forecast of the disk 114 utilizing 90% of its total storage capacity by the end of January. Since the forecaster 122 selected the Holt-Winter model as the most accurate model for the disk 114, the forecaster 122 does not use other models to continually create forecasts based on the real-time data for the disk 114, and the forecaster 122 does not typically need to output forecasts created for the disk 114 by the other models.

The forecast created by applying the selected model to the third data associated with the information technology resource may include a remaining time until depletion of the information technology resource, a usage of the information technology resource during a period of time, and/or a subsequent forecast created by applying the selected model to subsequent data associated with the information technology resource. For example, the forecaster 122 outputs a first icon that represents the Holt-Winter forecast for the disk 114, with the first icon indicating that the disk 114 has a total storage capacity of 100 gigabytes, 77 gigabytes of the disk 114's total storage capacity are currently being utilized, the 77 currently utilized gigabytes are 77% of the disk 114's total storage capacity, and that two months (or nine weeks) remain until the disk 114 will utilize 90% of its total storage capacity by the end of January. Continuing this example, the forecaster 122 also outputs a second icon that represents the autoregressive integrated moving average forecast for the disk 116, with the second icon indicating that the disk 116 has a total storage capacity of 100 gigabytes, 73 gigabytes of the disk 116's total storage capacity are currently being utilized, the 73 currently utilized gigabytes are 73% of the disk 116's total storage capacity, and that three months (or thirteen weeks) remain until the disk 116 will utilize 90% of its total storage capacity by the end of February. Further to this example, the forecaster 122 also outputs a third icon that represents the forecast for the combination of disk 114 and disk 116, with the third icon indicating that the disks 114-116 has a total storage capacity of 200 gigabytes, 150 gigabytes of the disks 114-116's combined total storage capacity are currently being utilized, the 150 combined currently utilized gigabytes are 75% of the disk 114-116's combined total storage capacity, and that two and a half months (or eleven weeks) remain until the disks 114-116 will utilize 90% of their combined total storage capacity by the middle of February. A remaining time can be the indefinite continued progress of existence and events that continue to exist in the future, as typically measured in hours and minutes. Depletion can be a total reduction in the number or quantity of a resource. A usage can be the action of employing or deploying a resource as a means of accomplishing a purpose or achieving a result. A period of time can be a length or portion of the indefinite continued progress of existence and events in the past, present, and future, as typically measured in hours and minutes.

If a subsequent forecast is created by applying the selected model to subsequent data associated with the information technology resource, the system 100 can output an alert based on a value associated with the subsequent forecast satisfying a threshold. For example, the forecaster 122 applied the autoregressive integrated moving average model to the disk 116's February through July storage capacity usage to create an autoregressive integrated moving average forecast that four weeks remain until the disk 116 will utilize 75% of its total storage capacity by the end of August. Continuing the example, the forecaster 122 applies the autoregressive integrated moving average model to the disk 116's first week of August storage capacity usage to create an autoregressive integrated moving average forecast that three weeks remain until the disk 116 will utilize 80% of its total storage capacity by the end of August.

Figure 4:
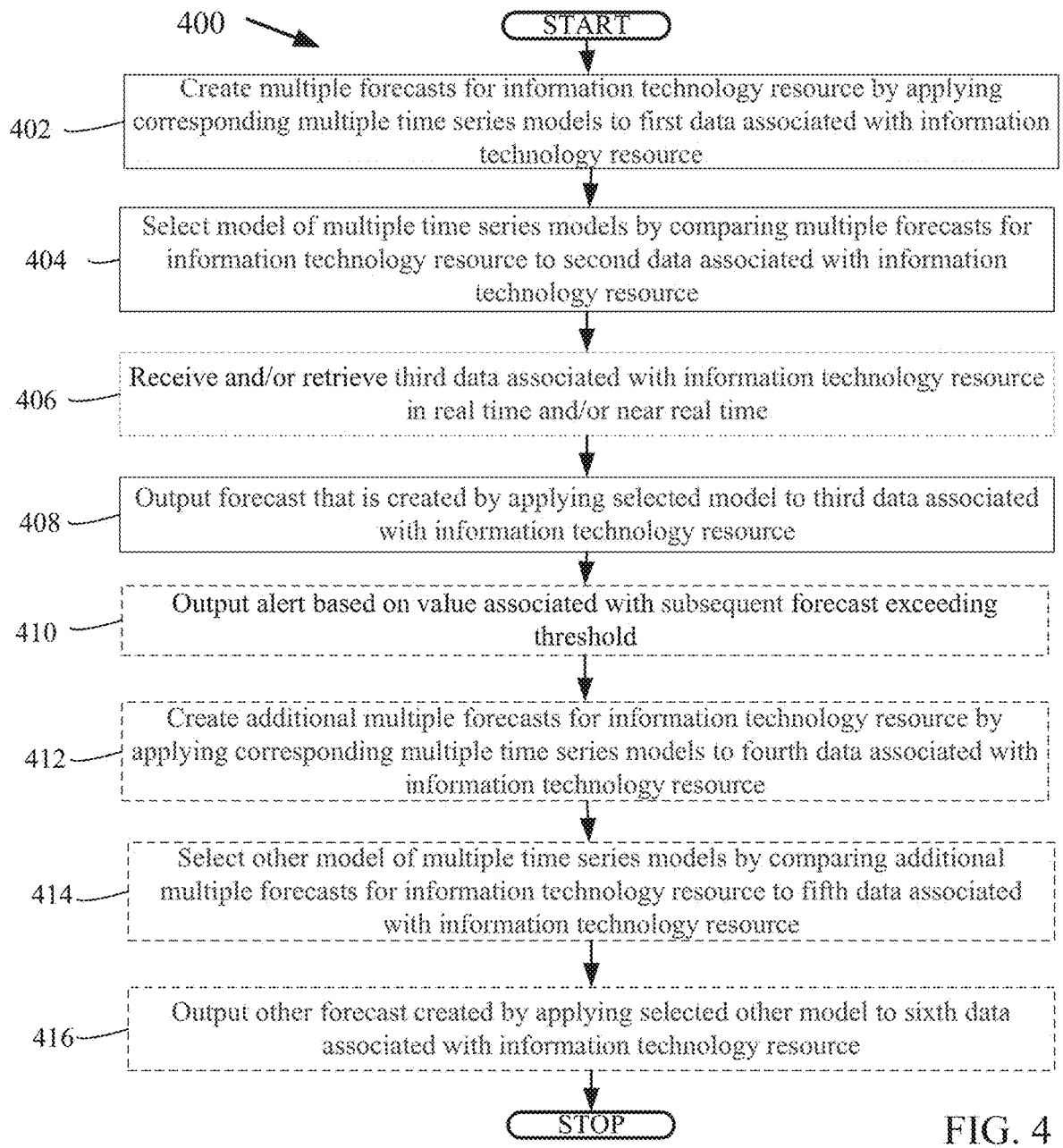
FIG. 4 is a flowchart that illustrates a method of information technology resource forecasting based on time series analysis, under an embodiment.

FIG. 4 illustrates an example graph 300 which depicts that receipt of the real-time data for the disk 116 during the first week of August results in a revised forecast 304 that differs sufficiently from the initial forecast 302, such that the forecaster 122 outputs an alert to a system administrator, with the alert including the graph 300 so that the system administrator can review the initial forecast 302, review the revised forecast 304, and take appropriate action. In this example, the alert was based on a forecast value of disk 116's storage capacity usage exceeding a predefined threshold of 80%, but the forecaster 122 can output an alert based on any value satisfying any threshold. An alert can be a warning of a danger, threat, or problem, typically with the intention of having it avoided or dealt with. A threshold can be the magnitude or intensity that must be satisfied for a certain reaction, phenomenon, result, or condition to occur or be manifested.

Periodically, the system 100 can verify whether the model selected to create the subsequent forecasts for an information technology resource is still the most accurate model selected to create the subsequent forecasts for the information technology resource. The system 100 can execute this verification process in the system 100's background, such that system users and system administrators may be unaware of the execution of the verification process.

Having output a forecast based on a previously selected model, the system 100 can create additional multiple forecasts for the information technology resource by applying the corresponding multiple time series models to fourth data associated with the information technology resource. For example, having output a Holt-Winter forecast based on the disk 114's June through November storage capacity usages, the forecaster 122 creates three new forecasts for disk 114's storage capacity usage by applying the autoregressive integrated moving average model, the Holt-Winter model, and the linear regression model to disk 114's December storage capacity usages. In this example, the fourth data is training data that is used to retrain the models to create forecasts for an information technology resource.

Once the new forecasts have been created, the system 100 can select another model of the multiple time series models by comparing the additional multiple forecasts for the information technology resource to fifth data associated with the information technology resource. For example, the forecaster 122 compares the new forecasts for the disk 114 to disk 114's January storage capacity usages, and changes the selection of the most accurate model for the disk 114 to the autoregressive integrated moving average model. In this example, the forecaster 122 changes the selection of the most accurate model for an information technology resource from the previously selected model to a newly selected model only because the newly selected model currently creates more accurate forecasts than the previously selected model creates for the information technology resource. If the previously selected model still creates the most accurate forecast for the information technology resource, the forecaster 122 continues using the previously selected model to create forecasts for the information technology resource. In this example, the fifth data is testing data that is used to retest which model is currently the most accurate model to create forecasts for an information technology resource.

When another model has been selected, the system 100 can output another forecast created by applying the selected other model to sixth data associated with the information technology resource. For example, the forecaster 122 applies the selected autoregressive integrated moving average model to disk 114's June through January storage capacity usages to create a forecast that the disk 114 will be utilizing 90% of its total storage capacity by the end of February. and outputs the forecast to a system administrator who can address disk 114's possible future storage capacity depletion. In this example, the sixth data is data that is created after the selection of a new model as the most accurate model to create subsequent forecasts for an information technology resource.

FIG. 4 is a flowchart that illustrates a method for information technology resource forecasting based on time series analysis, under an embodiment. Flowchart 400 illustrates method acts illustrated as flowchart blocks for certain steps involved in and/or between the clients 102-108 and/or the server 110 of FIG. 1.

Multiple forecasts are created for an information technology resource by applying corresponding multiple time series models to first data associated with the information technology resource, block 402. The system 100 uses models to creates forecasts for an information technology resource to select the most accurate model for creating subsequent forecasts for the information technology resource. For example and without limitation, this can include the forecaster 122 applying an autoregressive integrated moving average model, a Holt-Winter model, and a linear regression model to disk 114's June through September available storage capacity usages to create three forecasts for disk 114's storage capacity usages.

Having created multiple forecasts, a model is selected of the multiple time series models by comparing the multiple forecasts for the information technology resource to second data associated with the information technology resource, block 404. The system 100 selects the most accurate model for creating subsequent forecasts for the information technology resource. By way of example and without limitation, this can include the forecaster 122 comparing the forecasts for the disk 114 to disk 114's October through November storage capacity usages, and selecting the Holt-Winter model as the most accurate model for the disk 114.

The third data associated with the information technology resource is optionally received and/or retrieved in real-time and/or near real-time, block 406. The system 100 can retrieve real-time data to create forecasts for an information technology resource. In embodiments, this can include the forecaster 122 receiving the disk 114's subsequent storage capacity usages data in real-time.

After selecting the most accurate model for an information technology resource, a forecast is created by applying the selected model to third data associated with the information technology resource and output, block 408. The system 100 outputs forecasts for the information technology resource based on applying the most accurate model to the information technology resource. For example and without limitation, this can include the forecaster 122 applying the selected Holt-Winter model to disk 114's June through November storage capacity usages to create a forecast that the disk 114 will be utilizing 90% of its total storage capacity by the end of January, and outputs the forecast to a system administrator who can address disk 114's possible future storage capacity depletion.

If a subsequent forecast is created by applying the selected model to subsequent data associated with the information technology resource, an alert is optionally output based on a value associated with the subsequent forecast satisfying a threshold, block 410. The system 100 can output alerts based on sudden and unexpected changes in data for an information technology resource. By way of example and without limitation, this can include the forecaster 122 outputting an alert to a system administrator, with the alert including the graph 300 so that the system administrator can review the initial forecast 302, review the revised forecast 304, and take appropriate action.

Having output a forecast based on a previously selected model, additional multiple forecasts are optionally created for the information technology resource by applying the corresponding multiple time series models to fourth data associated with the information technology resource, block 412. The system 100 creates forecasts based on new data to reevaluate whether the model selected for an information technology resource is still the most accurate model for the information technology resource. In embodiments, this can include the forecaster 122 applying the autoregressive integrated moving average model, the Holt-Winter model, and the linear regression model to disk 114's December storage capacity usages to create three new forecasts for disk 114's storage capacity usages.

Once the new forecasts have been created, another model of the multiple time series models is optionally selected by comparing the additional multiple forecasts for the information technology resource to fifth data associated with the information technology resource, block 414. The system 100 can compare the new forecasts to select the most accurate model for an information technology resource. For example and without limitation, this can include the forecaster 122 comparing the forecasts for the disk 114 to disk 114's January storage capacity usages, and selecting the autoregressive integrated moving average model as the most accurate model for the disk 114.

When another model has been selected, another forecast created by applying the selected other model to sixth data associated with the information technology resource is optionally output, block 416. The system 100 can output a new forecast for an information technology resource based on the model recently selected as the most accurate model for the information technology resource. By way of example and without limitation, this can include the forecaster 122 applying the selected autoregressive integrated moving average model to disk 114's June through January storage capacity usages to create a forecast that the disk 114 will be utilizing 90% of its total storage capacity by the end of February, and outputting the forecast to a system administrator who can address disk 114's possible future storage capacity depletion.

Although FIG. 4 depicts the blocks 402-416 occurring in a specific order, the blocks 402-416 may occur in another order. In other implementations, each of the blocks 402-416 may also be executed in combination with other blocks and/or some blocks may be divided into a different set of blocks.

Figure 5:
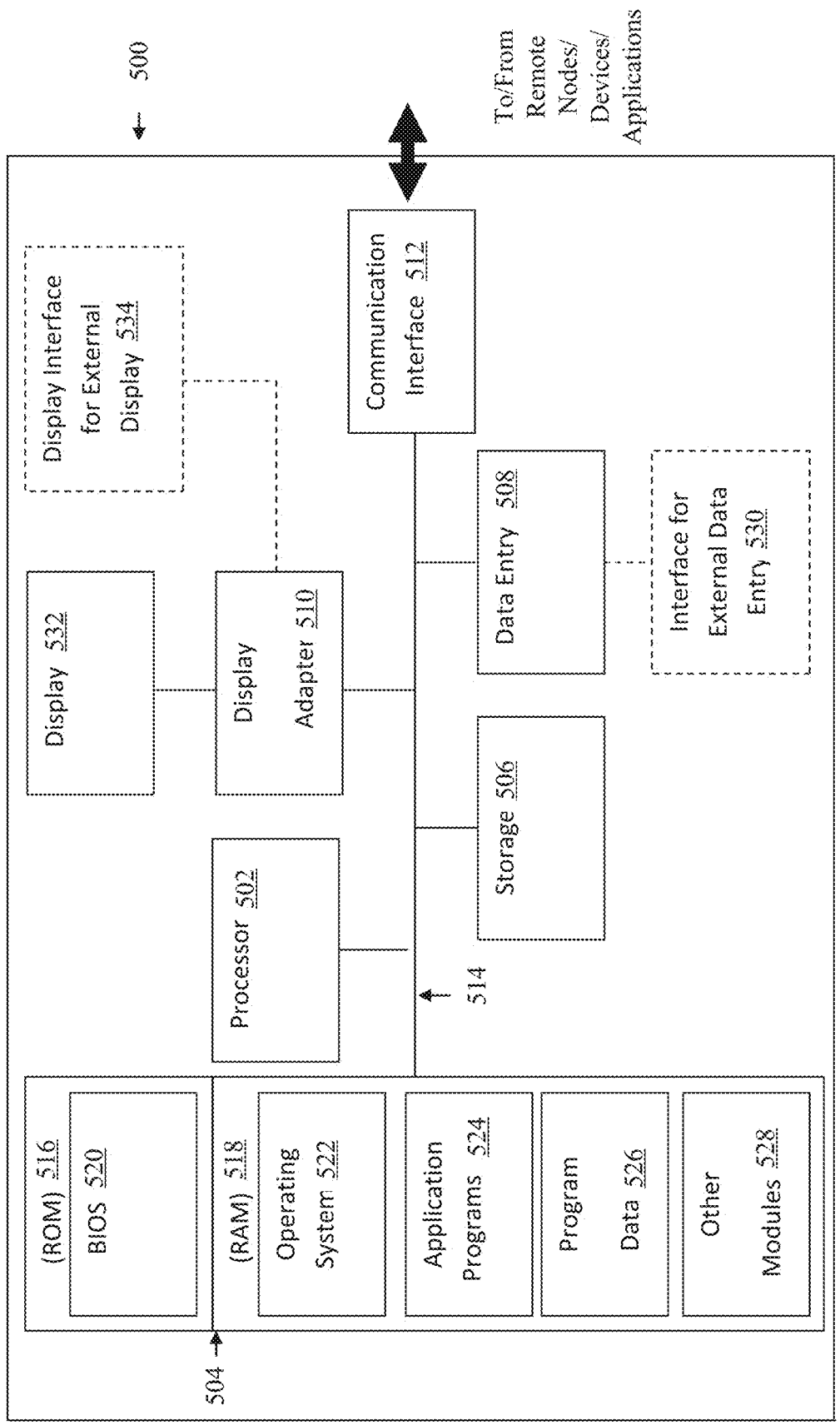
FIG. 5 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 5 may vary depending on the system implementation. With reference to FIG. 5, an exemplary system for implementing the subject matter disclosed herein includes a hardware device 500, including a processing unit 502, memory 504, storage 506, a data entry module 508, a display adapter 510, a communication interface 512, and a bus 514 that couples the elements 504-512 to the processing unit 502.

The bus 514 may comprise any type of bus architecture. Examples include a memory bus, a peripheral bus, a local bus, etc. The processing unit 502 is an instruction execution machine, apparatus, or device and may comprise a microprocessor, a digital signal processor, a graphics processing unit, an application specific integrated circuit (ASIC), a field programmable gate array (FPGA), etc. The processing unit 502 may be configured to execute program instructions stored in the memory 504 and/or the storage 506 and/or received via the data entry module 508.

The memory 504 may include read only memory (ROM) 516 and random access memory (RAM) 518. The memory 504 may be configured to store program instructions and data during operation of the hardware device 500. In various embodiments, the memory 504 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 504 may also include nonvolatile memory technologies such as nonvolatile flash RAM (NVRAM) or ROM. In some embodiments, it is contemplated that the memory 504 may include a combination of technologies such as the foregoing, as well as other technologies not specifically mentioned. When the subject matter is implemented in a computer system, a basic input/output system (BIOS) 520, containing the basic routines that help to transfer information between elements within the computer system, such as during start-up, is stored in the ROM 516.

The storage 506 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 500.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 506, the ROM 515 or the RAM 518, including an operating system 522, one or more applications programs 524, program data 526, and other program modules 528. A user may enter commands and information into the hardware device 500 through the data entry module 508. The data entry module 508 may include mechanisms such as a keyboard, a touch screen, a pointing device, etc. Other external input devices (not shown) are connected to the hardware device 500 via an external data entry interface 530. By way of example and not limitation, external input devices may include a microphone, joystick, game pad, satellite dish, scanner, or the like. In some embodiments, external input devices may include video or audio input devices such as a video camera, a still camera, etc. The data entry module 508 may be configured to receive input from one or more users of the hardware device 500 and to deliver such input to the processing unit 502 and/or the memory 504 via the bus 514.

A display 532 is also connected to the bus 514 via the display adapter 510. The display 532 may be configured to display output of the hardware device 500 to one or more users. In some embodiments, a given device such as a touch screen, for example, may function as both the data entry module 508 and the display 532. External display devices may also be connected to the bus 514 via an external display interface 534. Other peripheral output devices, not shown, such as speakers and printers, may be connected to the hardware device 500.

The hardware device 500 may operate in a networked environment using logical connections to one or more remote nodes (not shown) via the communication interface 512. The remote node may be another computer, a server, a router, a peer device or other common network node, and typically includes many or all of the elements described above relative to the hardware device 500. The communication interface 512 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 512 may include logic configured to support direct memory access (DMA) transfers between the memory 504 and other devices.

In a networked environment, program modules depicted relative to the hardware device 500, or portions thereof, may be stored in a remote storage device, such as, for example, on a server. It will be appreciated that other hardware and/or software to establish a communications link between the hardware device 500 and other devices may be used.

It should be understood that the arrangement of the hardware device 500 illustrated in FIG. 5 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 500.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 5.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for information technology resource forecasting based on time series analysis, the system comprising:
a processor-based application stored on a non-transitory computer-readable medium, which when executed on a computer, will cause one or more processors to:
create multiple forecasts for an information technology resource based on first data associated with the information technology resource by applying multiple different time series models to the first data, the multiple forecasts being estimates of future events associated with the information technology resource;
select a model of the multiple time series models by comparing each of the multiple forecasts for the information technology resource created using the first data to second data associated with the information technology resource, the second data being test data that is different than the first data and generated after generation of the first data;
generate a forecast by applying the selected model to third data associated with the information technology resource and a subsequent forecast by applying the selected model to subsequent data associated with the information technology resource, the third data being created after the selection of the model, the subsequent data being created after the creation of the third data; and
output the forecasts that are created by applying the selected model to the third data and the subsequent data, wherein outputting the forecasts includes outputting a graphical interface displayed on a display as an alert when a value associated with the subsequent forecast satisfies a threshold, the graphical interface comprising a graph displaying both the created forecast based on the third data and the subsequent forecast based on the subsequent data.

2. The system of claim 1, wherein creating the multiple forecasts for the information technology resource comprises creating a linear regression forecast for the information technology resource by applying a linear regression model to the first data associated with the information technology resource, and selecting the model of the multiple time series models comprises selecting one of the multiple time series models and the linear regression model by comparing the multiple forecasts for the information technology resource and the linear regression forecast to the second data associated with the information technology resource.

3. The system of claim 1, wherein the multiple time series models comprise at least one of a stochastic model, an autoregressive model, an integrated model, a moving average model, an autoregressive moving average model, an autoregressive integrated moving average model, an autoregressive fractionally integrated moving average model, a vector autoregression model, a multivariate model, an exogenous model, a nonlinear autoregressive exogenous model, an autoregressive conditional heteroskedasticity model, a doubly stochastic model, a markov switching multifractal model, a hidden markov model, a general state space model, an unobserved components model, and a holt-winter model.

4. The system of claim 1, wherein the processor-based application further causes the one or more processors to at least one of receive and retrieve the third data associated with the information technology resource in at least one of real-time and near real-time.

5. The system of claim 1, wherein the forecast created by applying the selected model to third data associated with the information technology resource comprises at least one of a remaining time until depletion of the information technology resource and a usage of the information technology resource during a period of time.

6. The system of claim 1, wherein the processor-based application further causes the one or more processors to:
   create additional multiple forecasts for the information technology resource by applying the corresponding multiple time series models to fourth data associated with the information technology resource;
   select another model of the multiple time series models by comparing the additional multiple forecasts for the information technology resource to fifth data associated with the information technology resource; and
   output another forecast created by applying the selected other model to sixth data associated with the information technology resource.

7. A computer-implemented method for information technology resource forecasting based on time series analysis, the method comprising:
   creating multiple forecasts for an information technology resource based on first data associated with the information technology resource by applying multiple different time series models to the first data, the multiple forecasts being estimates of future events associated with the information technology resource;
   selecting a model of the multiple time series models by comparing each of the multiple forecasts for the information technology resource created using the first data to second data associated with the information technology resource, the second data being test data that is different than the first data and generated after generation of the first data; and
   generating a forecast by applying the selected model to third data associated with the information technology resource and a subsequent forecast by applying the selected model to subsequent data associated with the information technology resource, the third data being created after the selection of the model, the subsequent data being created after the creation of the third data; and outputting the forecasts that are created by applying the selected model to third data and the subsequent data, wherein outputting the forecasts includes outputting a graphical interface displayed on a display as an alert when a value associated with the subsequent forecast satisfies a threshold, the graphical interface comprising a graph displaying both the created forecast based on the third data and the subsequent forecast based on the subsequent data.

8. The method of claim 7, wherein creating the multiple forecasts for the information technology resource comprises creating a linear regression forecast for the information technology resource by applying a linear regression model to the first data associated with the information technology resource, and selecting the model of the multiple time series models comprises selecting one of the multiple time series models and the linear regression model by comparing the multiple forecasts for the information technology resource and the linear regression forecast to the second data associated with the information technology resource.

9. The method of claim 7, wherein the multiple time series models comprise at least one of a stochastic model, an autoregressive model, an integrated model, a moving average model, an autoregressive moving average model, an autoregressive integrated moving average model, an autoregressive fractionally integrated moving average model, a vector autoregression model, a multivariate model, an exogenous model, a nonlinear autoregressive exogenous model, an autoregressive conditional heteroskedasticity model, a doubly stochastic model, a markov switching multifractal model, a hidden markov model, a general state space model, an unobserved components model, and a holt-winter model.

10. The method of claim 7, wherein the method further comprises at least one of receiving and retrieving the third data associated with the information technology resource in at least one of real-time and near real-time.

11. The method of claim 7, wherein the forecast created by applying the selected model to third data associated with the information technology resource comprises at least one of a remaining time until depletion of the information technology resource and a usage of the information technology resource during a period of time.

12. The method of claim 7, wherein the method further comprises:
   creating additional multiple forecasts for the information technology resource by applying the corresponding multiple time series models to fourth data associated with the information technology resource;
   selecting another model of the multiple time series models by comparing the additional multiple forecasts for the information technology resource to fifth data associated with the information technology resource; and
   outputting another forecast created by applying the selected other model to sixth data associated with the information technology resource.

13. A computer program product, comprising a non-transitory computer-readable medium having a computer-readable program code embodied therein to be executed by one or more processors, the computer-readable program code including instructions to:
   create multiple forecasts for an information technology resource based on first data associated with the information technology resource by applying multiple different time series models to the first data, the multiple forecasts being estimates of future events associated with the information technology resource;

select a model of the multiple time series models by comparing each of the multiple forecasts for the information technology resource created using the first data to second data associated with the information technology resource, the second data being test data that is different than the first data and generated after generation of the first data; and generate a forecast by applying the selected model to third data associated with the information technology resource and a subsequent forecast by applying the selected model to subsequent data associated with the information technology resource, the third data being created after the selection of the model, the subsequent data being created after the creation of the third data; and output the forecasts that are created by applying the selected model to third data and the subsequent data, wherein outputting the forecast includes outputting a graphical interface displayed on a display as an alert when a value associated with the subsequent forecast satisfying a threshold, the graphical interface comprising a graph displaying both the created forecast based on the third data and the subsequent forecast based on the subsequent data.

14. The computer program product of claim 13, wherein creating the multiple forecasts for the information technology resource comprises creating a linear regression forecast for the information technology resource by applying a linear regression model to the first data associated with the information technology resource, and selecting the model of the multiple time series models comprises selecting one of the model of the multiple time series models and the linear regression model by comparing the multiple forecasts for the information technology resource and the linear regression forecast to the second data associated with the information technology resource.

15. The computer program product of claim 13, wherein the multiple time series models comprise at least one of a stochastic model, an autoregressive model, an integrated model, a moving average model, an autoregressive moving average model, an autoregressive integrated moving average model, an autoregressive fractionally integrated moving average model, a vector autoregression model, a multivariate model, an exogenous model, a nonlinear autoregressive exogenous model, an autoregressive conditional heteroskedasticity model, a doubly stochastic model, a markov switching multifractal model, a hidden markov model, a general state space model, an unobserved components model, and a holt-winter model.

16. The computer program product of claim 13, wherein the computer-readable program code includes further instructions to at least one of receive and retrieve the third data associated with the information technology resource in at least one of real-time and near real-time.

17. The computer program product of claim 13, wherein the forecast created by applying the selected model to third data associated with the information technology resource comprises at least one of a remaining time until depletion of the information technology resource and a usage of the information technology resource during a period of time.

18. The computer program product of claim 13, wherein the computer readable program code includes further instructions to:

create additional multiple forecasts for the information technology resource by applying the corresponding multiple time series models to fourth data associated with the information technology resource;

select another model of the multiple time series models by comparing the additional multiple forecasts for the information technology resource to fifth data associated with the information technology resource; and output another forecast created by applying the selected other model to sixth data associated with the information technology resource.

\* \* \* \* \*